(12) United States Patent
Helterbrand et al.

(10) Patent No.: US 8,899,805 B2
(45) Date of Patent: Dec. 2, 2014

(54) VEHICLE LIGHT BAR AND METHOD FOR PRODUCING THE SAME

(71) Applicants: David Helterbrand, Eureka, MO (US); John Helterbrand, St. Louis, MO (US)

(72) Inventors: David Helterbrand, Eureka, MO (US); John Helterbrand, St. Louis, MO (US)

( * ) Notice: Subject to any disclaimer, the term of this patent is extended or adjusted under 35 U.S.C. 154(b) by 89 days.

(21) Appl. No.: 13/628,633

(22) Filed: Sep. 27, 2012

(65) Prior Publication Data

US 2013/0077336 A1 Mar. 28, 2013

Related U.S. Application Data

(60) Provisional application No. 61/539,544, filed on Sep. 27, 2011.

(51) Int. Cl.
*B60Q 1/26* (2006.01)
(52) U.S. Cl.
CPC .................................. *B60Q 1/2611* (2013.01)
USPC ............ 362/541; 362/505; 362/506; 362/545
(58) Field of Classification Search
CPC .............. F21S 8/10; F21S 48/00; B60Q 1/26; B60Q 1/2623; B60Q 1/2638
USPC ......... 362/541, 542, 543, 544, 545, 546, 493, 362/499, 505, 506
See application file for complete search history.

(56) References Cited

U.S. PATENT DOCUMENTS

| | | | | |
|---|---|---|---|---|
| 5,150,959 A | * | 9/1992 | Paffrath et al. | 362/548 |
| 7,431,485 B1 | * | 10/2008 | Saward et al. | 362/493 |
| 8,172,440 B2 | * | 5/2012 | Aulakh et al. | 362/496 |
| 8,192,063 B2 | * | 6/2012 | Neufeglise | 362/541 |
| 2004/0109313 A1 | * | 6/2004 | Smith | 362/240 |
| 2008/0019141 A1 | * | 1/2008 | Helms et al. | 362/544 |
| 2010/0097819 A1 | * | 4/2010 | Schellens | 362/541 |

OTHER PUBLICATIONS

Core Public Safety LLC, corepublicsafety.com website of "Brooking Shadow—Tahoe Rear Spoiler Lightbar," 2013, pp. 1-3.
Tomar Scorpion, 970 STINGER Installation Instructions Manual, pp. 1-10.
Tomar Scorpion, pictures of rear spoiler light bar, 2013, 7 pages.

* cited by examiner

*Primary Examiner* — Ali Alavi
(74) *Attorney, Agent, or Firm* — Polster, Lieder, Woodruff & Lucchesi, L.C.

(57) ABSTRACT

A light bar assembly mounted on the roof or rear door of an emergency vehicle. The assembly includes a light bar support shaped for the particular make and model of a vehicle on which the assembly is installed or alternately a support configured for mounting on two or more different vehicle models. The support has openings formed in it, each corresponding to the location of a preexisting opening formed in the vehicle for electrical wiring and mounting fasteners that can be used to attach the support to the vehicle so that no additional openings or other alterations are required. This allows the light bar assembly to be readily mounted on the vehicle without modifications to the vehicle or the assembly being required. Lights are mounted on the support. The lights are selectively illuminated in accordance with the use of the vehicle in emergency or other situations.

20 Claims, 7 Drawing Sheets

VEHICLE LIGHT BAR AND METHOD FOR PRODUCING THE SAME

CROSS REFERENCE TO RELATED APPLICATIONS

This application claims the benefit of U.S. Provisional Application No. 61/539,544, entitled IMPROVED VEHICLE LIGHT BAR AND METHOD FOR PRODUCING THE SAME, filed on Sep. 27, 2011. The disclosure of the above application is incorporated herein by reference.

STATEMENT REGARDING FEDERALLY SPONSORED RESEARCH OR DEVELOPMENT

Not applicable.

BACKGROUND OF THE INVENTION

This invention relates to a light bar assembly for a vehicle; and, more particularly to a novel light bar assembly for installation on an official, emergency, or government vehicle. The light bar assembly is configured to be removably attached to the vehicle while requiring no modifications to the vehicle or the light bar assembly.

Vehicles used in emergency and/or repair circumstances, such as, for example, ambulances, police and fire department vehicles, road crew vehicles, military and other government vehicles, often utilize specially designated lights which are positioned on the vehicle and, when activated, alert others in the vicinity to the vehicle's presence. This is done so other vehicles, or pedestrians, can get out of the way of the vehicle and promote its safe passage through an area. Over time, it has become commonplace for a combination or array of such lights to be mounted or positioned on a single framework for attachment to the vehicle. Such combinations are commonly referred to as "light bars" in the industry.

Light bars are accessories for emergency vehicles. That is, light bars are attached to the emergency vehicle after the vehicle has been produced by the vehicle manufacturer and delivered to the agency using the vehicle. Traditionally, little attention has been paid to the method of attachment of a light bar to a vehicle other than ensuring the light bar is securely fastened in place and will not be dislodged, particularly when the vehicle is moving at high speed which it often must do in emergency situations.

Consequently, light bars are conventionally attached to an emergency vehicle or other vehicle by modifying the vehicle. This usually involves drilling holes in the vehicle body (or other components) which are not specified or otherwise required as part of the original vehicle manufacture. Alternatively, welds, clamps and other forms of attachment are sometimes used. These alternate forms of attachment subject the vehicle to stresses for which it was not designed. Often times the installation process also requires modification to the light bar for specific applications.

Vehicle and light bar assembly modifications are costly and time consuming, and can also cause significant problems. That is, since they are not part of the vehicle's OEM specifications and are not typically made at a manufacturer's service center or garage, it is not uncommon for such modifications to inadvertently damage the vehicle with unexpected and undesirable results. For example, electrical wires and other electrical components may be damaged or broken. Further, any improper sealing where the modifications are made can result in exposure to the weather and lead to premature corrosion or component failure problems.

The modifications may also invalidate the manufacturer's warranties. For example, a warranty regarding the vehicle's fit and finish (e.g., body paint) may be voided if the modifications to the vehicle subject it to unnecessary weather exposure and corrosion. Similarly, a modification that damages the vehicle's components, or subjects components to accelerated deterioration, may also result in the warranty being voided. For example, official, emergency, and government vehicles are often sold to the general public at the end of their service life to an agency. In such instances, it has been found that vehicle modifications needed for mounting light bars to the vehicle compromise the condition of the vehicle and detract from the vehicle resale value.

It is therefore desirable to provide a light bar assembly adapted to be removably attached to the vehicle without requiring modification to the vehicle or to the light bar assembly.

Moreover, vehicles of differing makes and models are commonly used for emergency and other vehicles that utilize light bars. Such different makes and models of vehicles have differing body shapes, sizes and configurations. Traditionally, light bars of differing configurations are used for each make and model of vehicle. That is, no light bar has been designed for use on any more than one make and model of vehicle. It is therefore also desirable to provide a light bar assembly adapted to be universally and removably attached to more than one make and model of vehicle without requiring modification to the vehicle or to the light bar assembly.

The light bar assembly of the present invention overcomes the problems described above and provides significant benefits over existing technology.

BRIEF DESCRIPTION OF THE DRAWINGS

The illustrative embodiments of the present invention are shown in the following drawings which form a part of the specification.

Corresponding reference characters indicate corresponding parts throughout the several views of the drawings.

DETAILED DESCRIPTION

The following detailed description illustrates the invention by way of example and not by way of limitation. This description clearly enables one skilled in the art to make and use the invention, and describes several embodiments, adaptations, variations, alternatives and uses of the invention, including what is presently believed to be the best mode of carrying out the invention. Additionally, it is to be understood that the invention is not limited in its application to the details of construction and the arrangement of components set forth in the following description or illustrated in the drawings. The invention is capable of other embodiments and of being practiced or carried out in various ways. Also, it will be understood that the phraseology and terminology used herein is for the purpose of description and should not be regarded as limiting.

In the description which follows, it will be understood that the term vehicle or emergency vehicle includes for example ambulances, police and fire department vehicles, road crew vehicles, and military and other government vehicles.

Figures 1, 3:
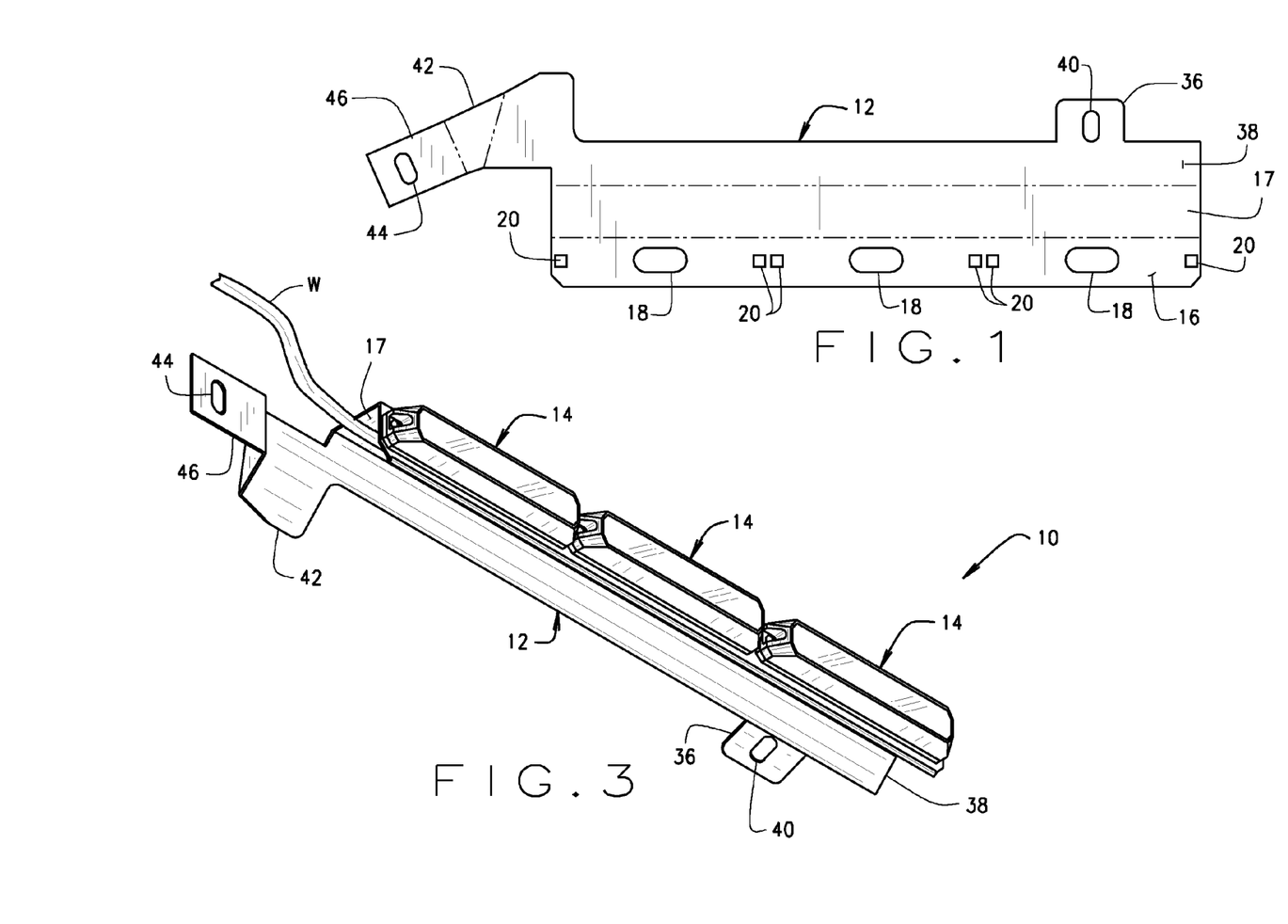
FIG. 1 is an elevation view of a light bar support blank for a first embodiment of the present invention on which emergency vehicle lights are installed.
FIG. 3 is an exploded perspective view of a light bar assembly of the embodiment shown in FIG. 2.
Figure 2:
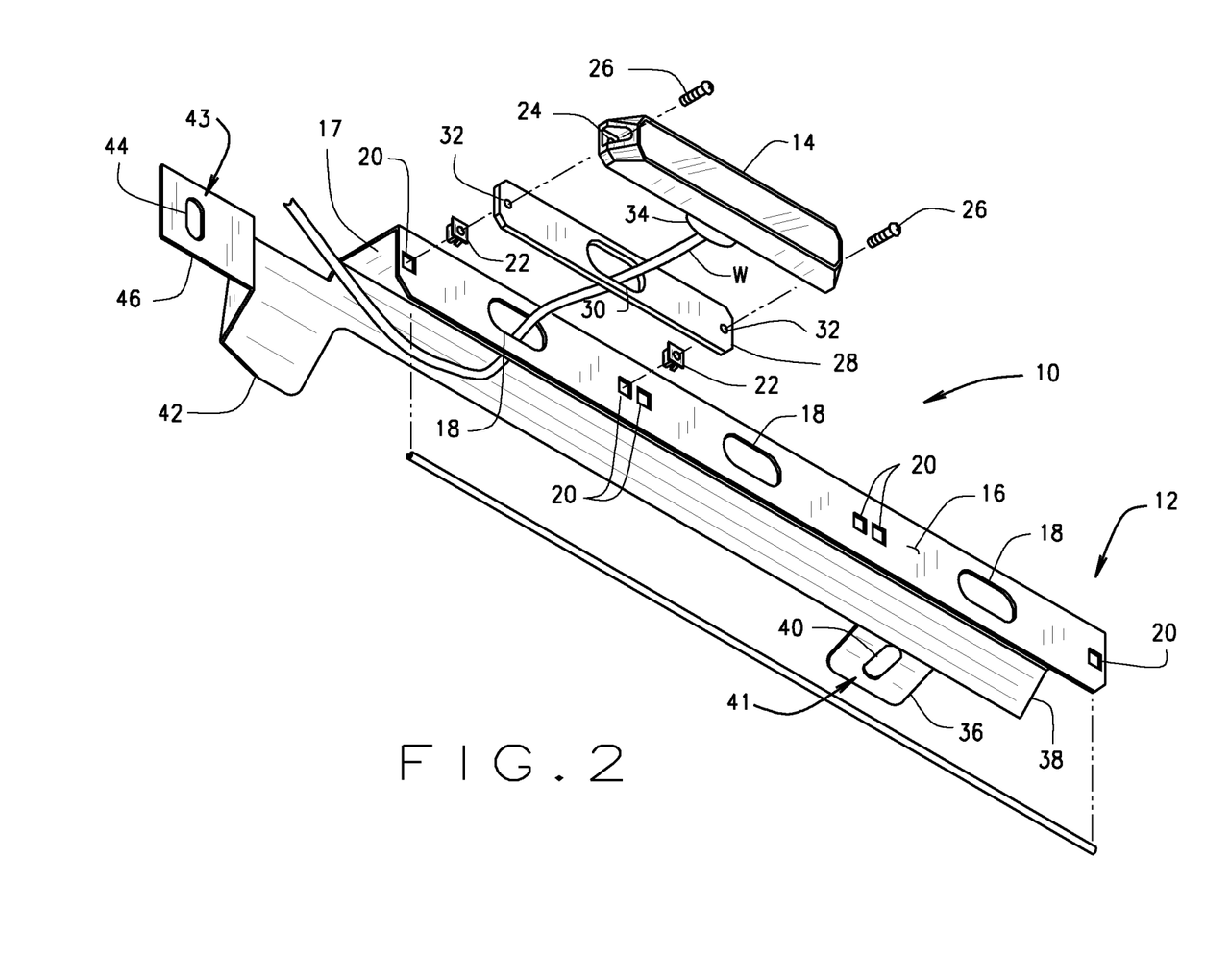
FIG. 2 is a perspective view of a first embodiment of the light bar assembly of the present invention showing how a light is installed on the support after the support blank has been shaped.

Referring to the drawings, an embodiment of a light bar assembly of the present invention is indicated generally at 10 in FIGS. 2 and 3. The assembly 10 includes an elongate light bar support 12 formed and shaped for a particular make and model of a vehicle on which the assembly 10 is to be mounted, the support 12 configured for attachment at a mount location on the vehicle V having no preexisting light. The assembly further having at least one light 14 attached to the support bar 12 with associated electrical wiring W. FIG. 1 discloses the support 12 configured as a sheet metal blank prior to bending into the shape shown in FIGS. 2-3 and 5-6.

Support 12 is generally U-shaped having a generally flat upper portion 16 a generally flat spine 17 attached to the upper portion 16, and a generally flat lower portion 38 attached to the spine 17 opposite the upper portion 16. While the upper portion 16 is generally perpendicular to the spine 17, the lower portion 38 is attached to the spine 17 at an angle of approximately 30 degrees away from parallel to the upper portion 16 as shown.

The support 12 has three collinear slots 18 formed in it, the slots 18 being generally equidistantly spaced along the length of upper portion 16. Adjacent each end of each slot 18 is a generally square shaped opening 20 for receiving a correspondingly shaped expanding nut 22. Each light 14 has an opening 24 at each end for a screw 26 to be inserted. A backing plate 28 has a shape corresponding in size and shape to the backside of light 14. The backing plate 28 has a central opening 30 corresponding in size and shape to opening 18 in support 12, and outer openings 32 sized for the threaded shank of a screw 26 to fit snugly yet freely through it to secure the light 14 and the backing plate 28 to the support 12.

A light 14 and matching backing plate 28 are collectively mounted to upper portion 16 of support 12 by placing backing plate 28 against the upper portion 16, placing the backside of the light 14 against the backing plate 28, and threading screws 26 through the respective openings 24 in the light 14 and 32 in the backing plate 28 and then into a nut 22 mounted in the opening 20. An electrical connector 34 on the back side of light 14 extends through the opening 30 in the backing plate and opening 18 in upper portion 16. The electrical wiring W is then routed through the channel formed in the support and connected to the connectors 34 of the lights for supplying electricity to the light 14 for selective illumination.

A tab 36 projects out from lower portion 38 of support 12 away from spine 17. The tab 36 is located inwardly from one end of the support 12 and, as shown in the drawings, is located generally beneath one of the slots 18 in the upper portion 16. The tab 36 has a generally vertically extending oval shaped slot 40 that forms an attachment point or structure 41 at the slot 40.

Extending outwardly from lower portion 38 at the opposite end of the support 12 from tab 36 is a generally Z-shaped (when viewed in plan) bracket 42. A generally vertically extending slot 44 is formed in an outer leg 46 of the bracket 42 and thereat forms a second attachment point or structure 43.

Figure 5:
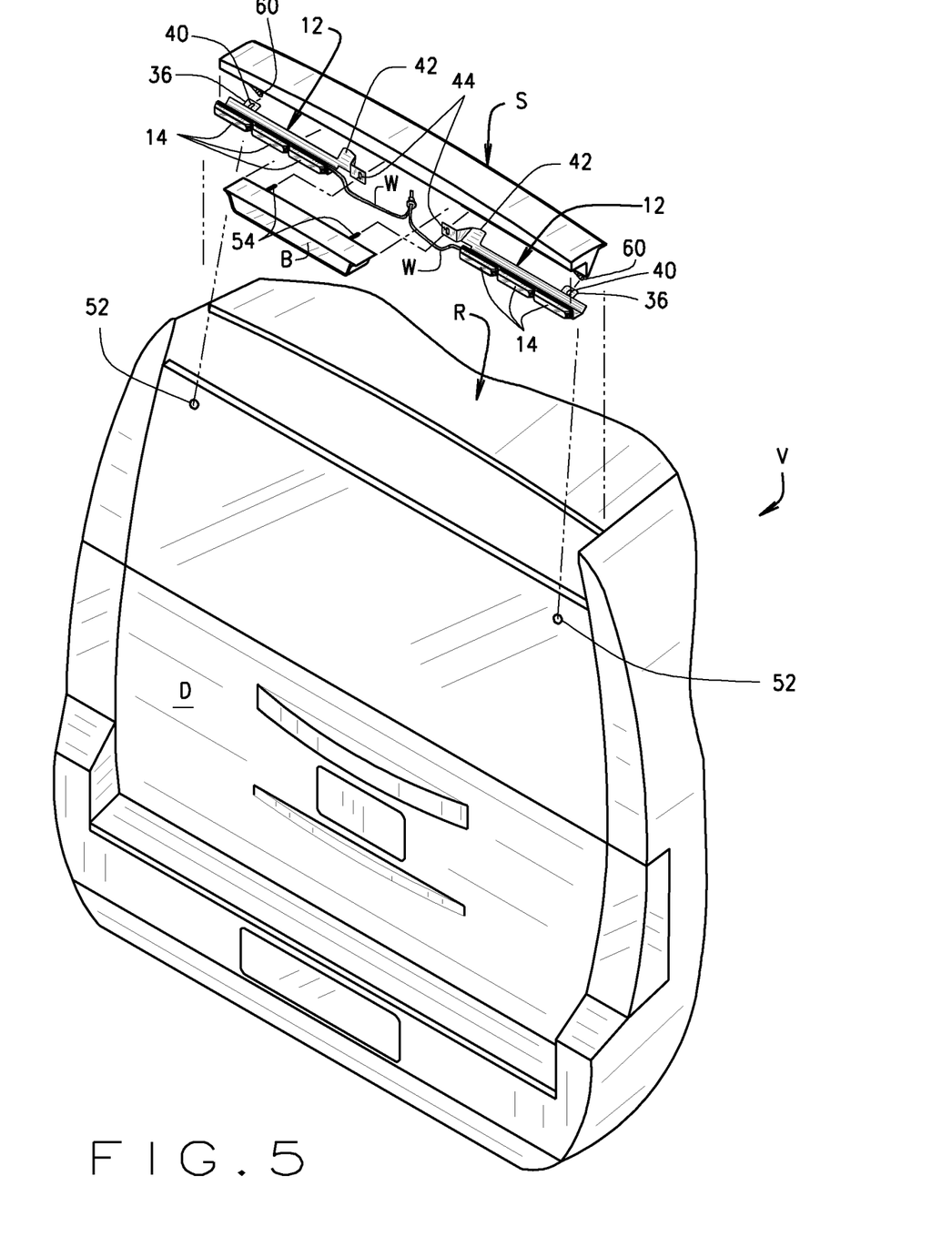
FIG. 5 illustrates installation of a pair of matching light bar assemblies of the embodiment of FIG. 2 on a vehicle.
Figure 6:
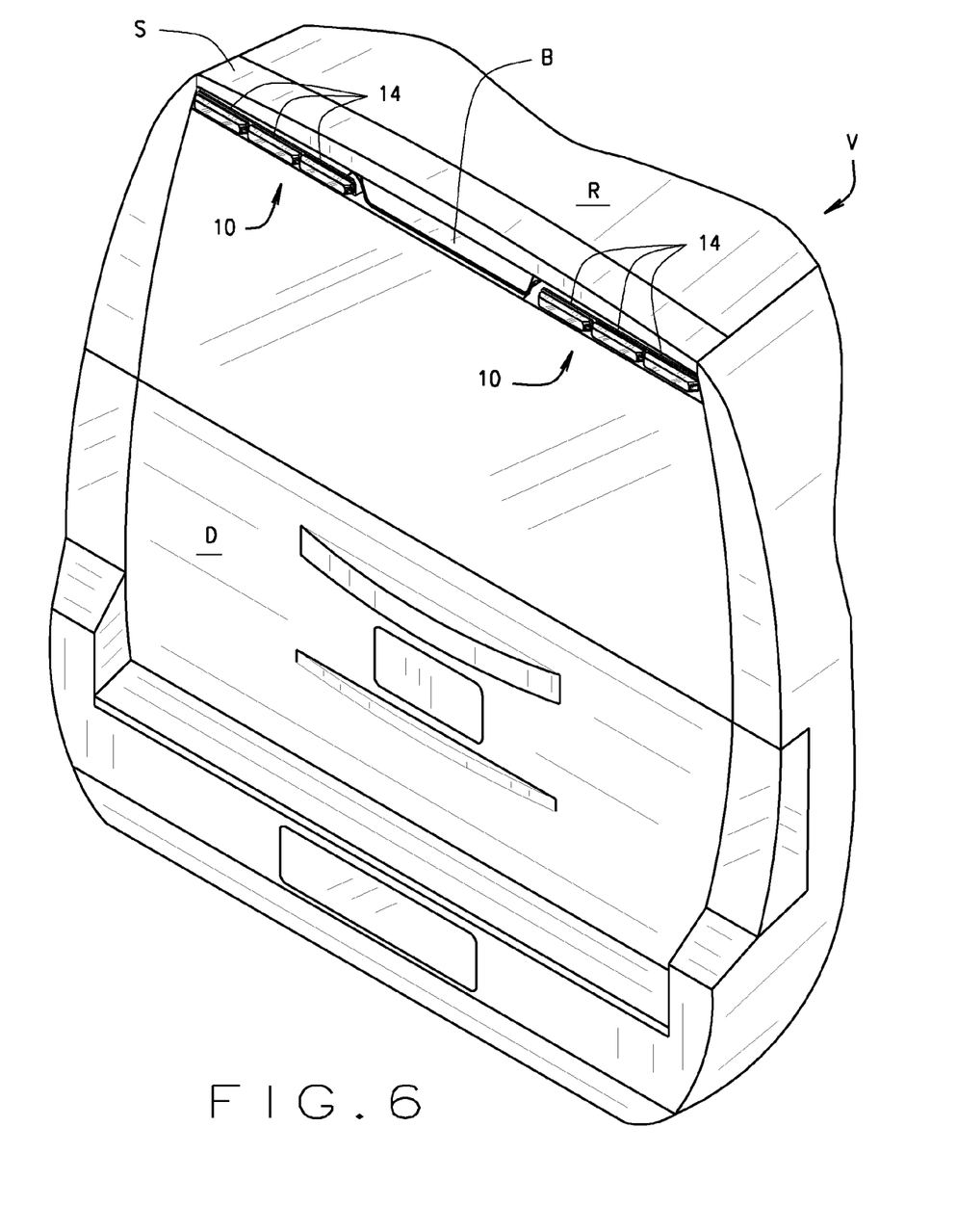
FIG. 6 illustrates the pair of light bar assemblies shown in FIG. 5 fully installed on the vehicle.

Referring to FIGS. 5 and 6, the rear portion of a vehicle V is depicted having a roof R and a rear door D with a spoiler S mounted at the top of the door D at the rear end of the roof R. The spoiler S has a brake light B at its center. The brake light B is originally attached to the spoiler S with a pair of bolts 54 rigidly mounted in the brake light that fit through a corresponding set of preexisting openings in the spoiler S (not shown) and thread into a corresponding set of nuts on the underside of the spoiler S (not shown), where each preexisting opening constitutes an attachment point or structure for the light assembly 10. Of course, in other vehicles, the brake light B may be attached to the spoiler S with bolts that fit through openings in the brake light and screw into threaded openings in the spoiler.

The spoiler S is originally attached to the rear door D with a series of bolts 60 rigidly mounted in the spoiler S that fit through a corresponding set of preexisting openings 52 in the door D and thread into a corresponding set of nuts on the inside of the door D (not shown), where each preexisting opening 52 constitutes an attachment point or structure for the light assembly 10. By way of example, a pair of matching light bar assemblies 10 are shown to be mounted to the vehicle V where there are no preexisting lights on the vehicle V, between the spoiler S and the rear door D, at attachment point or structures 54. For the embodiment shown in FIGS. 5 and 6, the supports 12 for the light bar assemblies 10 mirror each other in shape with the wiring W for each assembly extending towards each other from the inner ends of the channels formed in the respective assemblies 10.

As can be seen in FIGS. 5 and 6, the light bar 10 is configured to conform to the contours of the vehicle V to which it will be mounted. In this regard, the slots 40 in the support 12 are shaped, sized and located to mate with two of the preexisting openings 52 in rear door D and the corresponding two preexisting threaded bolts 60 mounted in and extending from the underside of the spoiler S of the vehicle V. In addition, the slots 44 in the support 12 are shaped, sized and located to mate with and slidingly receive the corresponding set of preexisting bolts 54 extending from the underside of the brake light B and the corresponding set of preexisting openings in the spoiler S (not shown), and to slidingly receive the brake light bolts 54 there through. For safety, a plastic or rubber protective U-shaped strip 47 is snugly secured along the edge of the upper portion 16 of the support 12.

To mount the assemblies 10 of the embodiment shown in FIGS. 1-3 and 5-6 to a vehicle V, the spoiler S is first removed from the rear door D of the vehicle V by removing the nuts from spoiler mount bolts 60 that protrude from the underside of the spoiler S and extend through corresponding preexisting openings 52 the door D. Next, the brake light B is removed from the spoiler S by removing the nuts from brake light mount bolts 54 that protrude from the underside of the brake light B and extend through the spoiler S. Then, the outer leg 46 of one of the two supports 12 is positioned between the brake light B and the spoiler S such that the slot 44 aligns with and slides onto one of the two the brake light bolts 54. The second of the two supports 12 is likewise positioned on the other brake light bolt 54. The brake light B is then mounted to the spoiler S by tightening the nuts (not shown) to each of the bolts 54 under the spoiler S with the brackets 46 secured there between. Next, the slot 40 of one of the two supports 12 slides onto one of the two the spoiler mount bolts 60. The second of the two supports 12 slides on the other spoiler mount bolt 60. As can be appreciated, this positions the lower portions 38 of each of the supports 12 against the underside of the spoiler S.

After the assemblies 10 are in place and the appropriate electrical connections are made, the spoiler S, with the supports 12, is reattached to the door D by sliding the spoiler mount bolts through the corresponding openings 52 in the door D and tightening the nuts (not shown) to each of the bolts 52 on the inside of the vehicle V with the lower portions 38 of each of the supports 12 secured there between. The completed mount is shown in FIG. 6.

As can be appreciated, various combinations of light bar assemblies 10 and lights 14 can be constructed for mounting to a single vehicle V. That is, a vehicle V may have one or more light bar assemblies 10 mounted to the vehicle, and each such light bar assembly 10 can be constructed with one or multiple lights 14. Further, the lights 14 can all be of the same color, or a combination of various different colors. Further, the lights 14 can be activated or illuminated in different sequences and patterns by a control system (not shown) adapted to selectively activate one or more of the lights 14 on an assembly 10, and depending upon how the control system for the lights 14 is configured and utilized. It will be understood by those skilled in the art that certain patterns may be used by one type of emergency vehicle, and other patterns by other types of vehicles.

Figure 4:
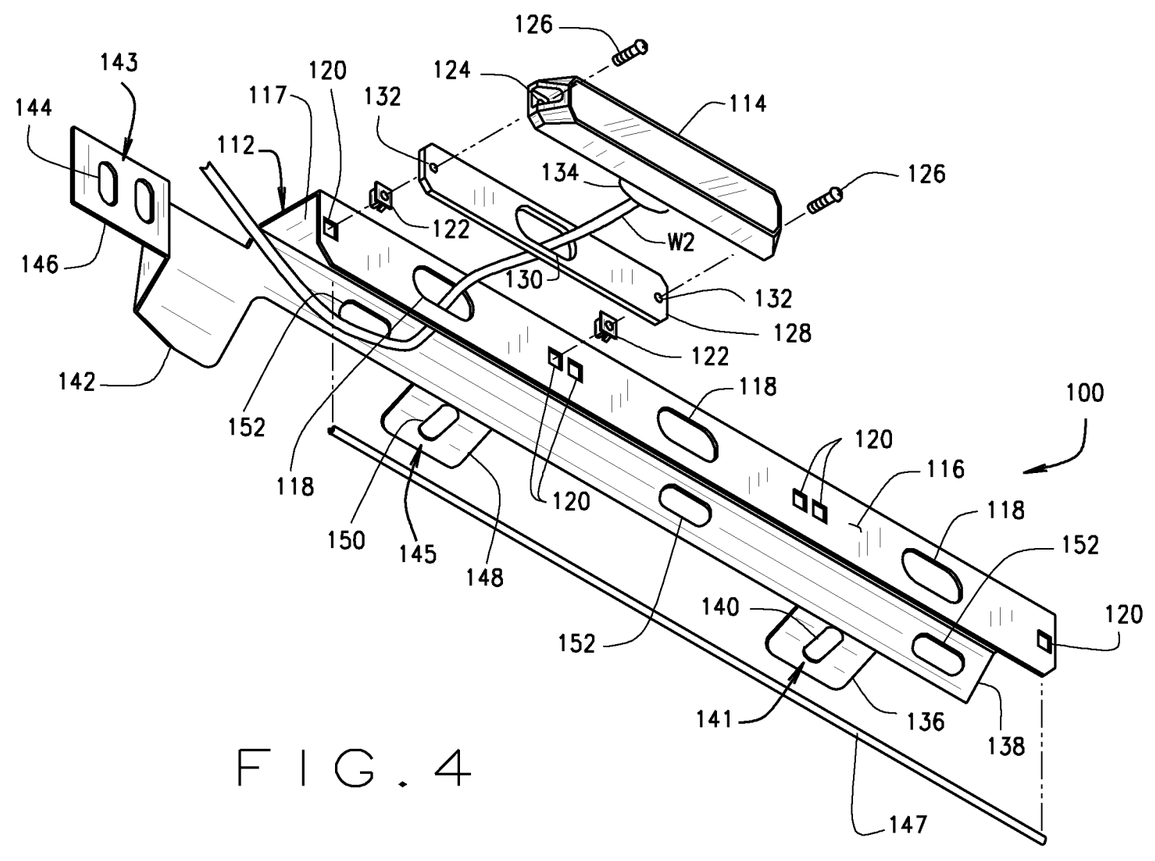
FIG. 4 is an exploded perspective view of an alternate embodiment of the light bar assembly of the present invention.

Another embodiment of the novel light bar assembly is shown at 100 in FIG. 4. The light bar assembly 100 is a universal configuration. That is, the assembly 100 is adapted to mount to more than one vehicle model without modification to the assembly 100 or to any of the more than one vehicle models for which the assembly 100 has been configured.

The assembly 100 includes an elongate light bar support 112 formed and shaped for a select group of models of vehicles on which the assembly 100 is to be mounted, the support 112 configured for attachment at a mount location on the vehicle V2 having no preexisting light. The assembly 100 having at least one light 114 attached to the support bar 112 with associated electrical wiring W2. Support 112 is generally U-shaped having a generally flat upper portion 116 in which at least one oval shaped slot 118 is formed. In the embodiment shown in FIG. 4, the support 112 is shown as having three slots 118 formed in it, the slots 118 being generally equidistantly spaced along the length of upper portion 116. Adjacent each end of each slot 118 is a generally square shaped opening 120 for receiving a correspondingly shaped expanding nut 122. Each light 114 has an opening 124 at each end for a screw 126 to be inserted. A backing plate 128 has a shape corresponding in size and shape to the backside of light 114. The backing plate 128 has a central opening 130 corresponding in size and shape to opening 118 in support 112, and outer openings 132 sized for the threaded shank of a screw 126 to fit snugly yet freely through it to secure the light 114 and the backing plate 128 to the support 112.

A light 114 and matching backing plate 128 are collectively mounted to upper portion 116 of support 112 by placing backing plate 128 against the upper portion 116, placing the backside of the light 114 against the backing plate 128, and threading screws 126 through the respective openings 124 in the light 114 and 132 in the backing plate 128 and then into a nut 122 mounted in the opening 120. An electrical connector 134 on the back side of light 114 extends through the opening 130 in the backing plate and opening 118 in upper portion 116. The electrical wire or wires W2 are then routed through the channel formed in the support and connected to the connectors 134 of the lights for supplying electricity to the light 114 for selective illumination.

Support 112 is generally U-shaped having a generally flat upper portion 116 a generally flat spine 117 attached to the upper portion 116, and a generally flat lower portion 138 attached to the spine 117 opposite the upper portion 16. While the upper portion 116 is generally perpendicular to the spine 117, the lower portion 138 is attached to the spine 117 at an angle of approximately 130 degrees away from parallel to the upper portion 116 as shown.

A tab 136 projects out from lower portion 138 of support 112 away from spine 117. The tab 136 is located inwardly from one end of the support 112 and is located generally beneath one of the slots 118 in the upper portion 116. The tab 136 has a generally vertically extending oval shaped slot 40 that forms an attachment point or structure 141 at the slot 140.

Extending outwardly from lower portion 138 at the opposite end of the support 112 from tab 136 is a generally Z-shaped (when viewed in plan) bracket 142. A generally vertically extending slot 144 is formed in an outer leg 146 of the bracket 142 and thereat forms a second attachment point or structure 143.

Additionally, a tab 148 projects out from lower portion 138 of support 112 away from spine 117. The tab 148 is located between the tab 136 and the Z-shaped bracket 142. Like the tab 136, the tab 148 has a generally vertically extending oval shaped slot 150 that forms an attachment point or structure 141 at the slot 150.

The support 112 further has three generally horizontally extending oval shaped slots 152. The slots 152 are positioned along the center of lower portion 138 generally equidistant from one another. For safety, a plastic or rubber protective U-shaped strip 147 is snugly secured along the edge of the upper portion 16 of the support 112.

Figure 7:
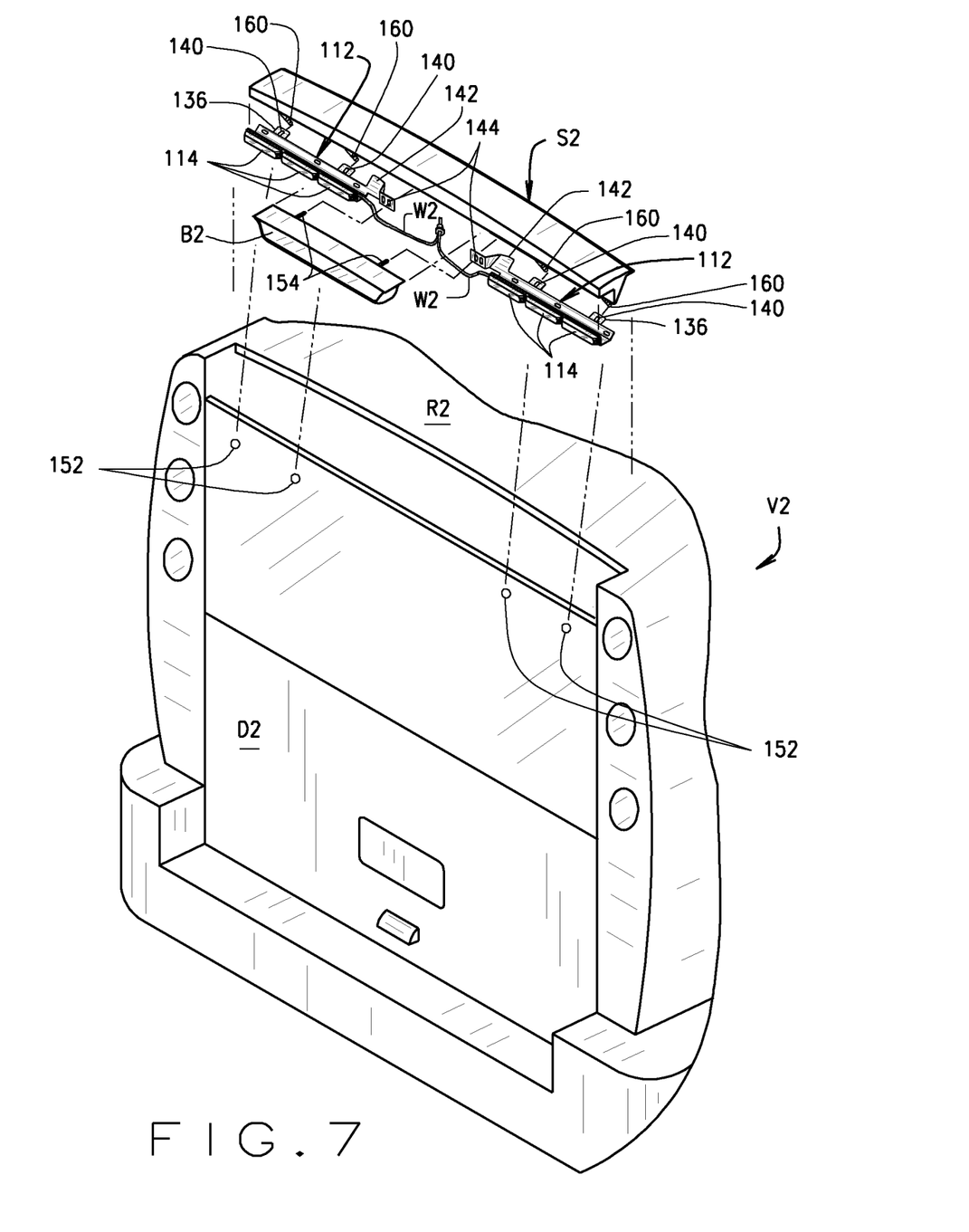
FIG. 7 illustrates installation of a pair of matching light bar assemblies of the embodiment of FIG. 4 on a vehicle.
Figure 8:
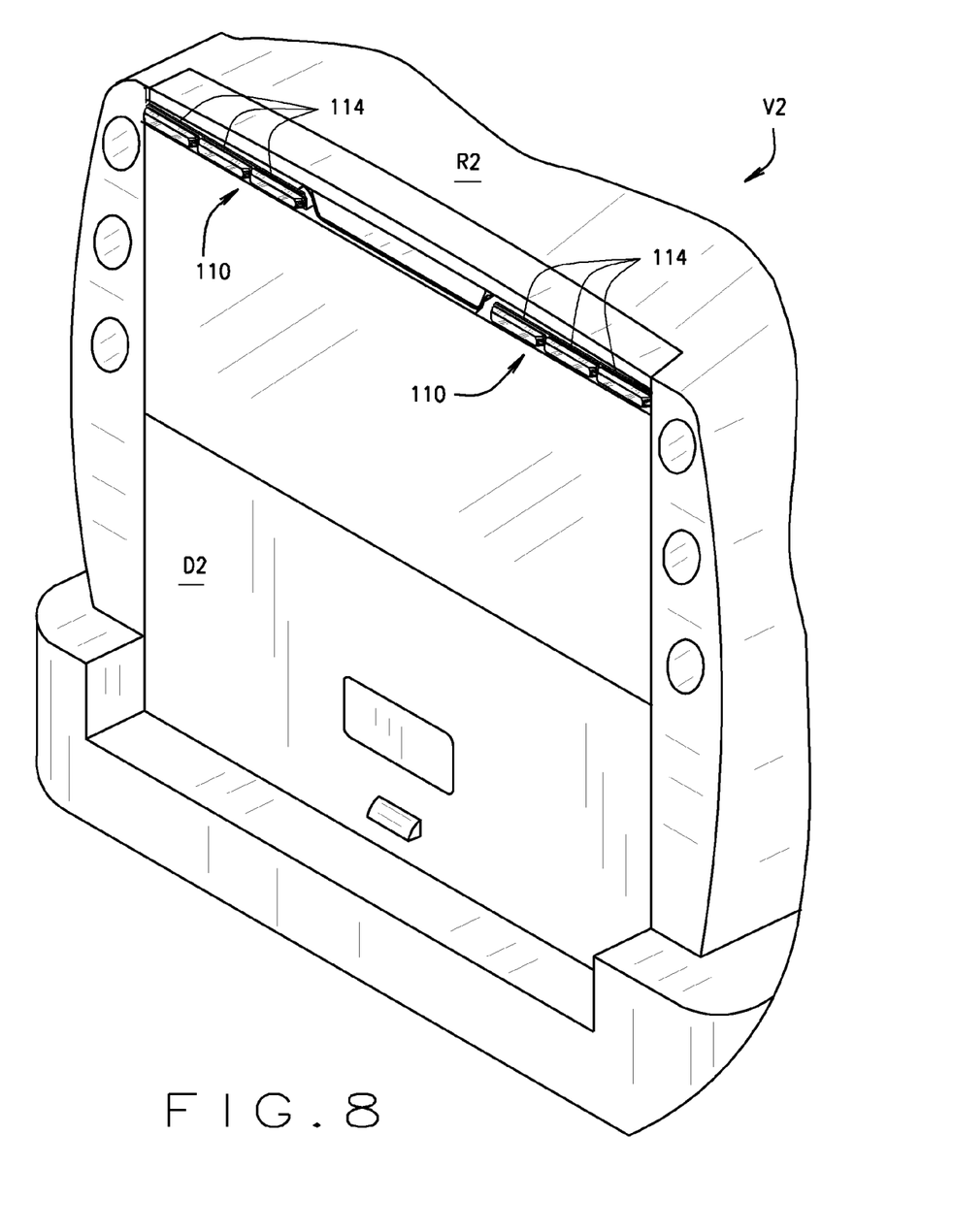
FIG. 8 illustrates the pair of light bar assemblies shown in FIG. 7 fully installed on the vehicle.

Referring to FIGS. 7 and 8, the rear portion of a vehicle V2 is depicted, the vehicle V2 being one of two or more vehicles to which the assembly 100 can be mounted without modifying the vehicle or the assembly 100. The vehicle V2 has a roof R2 and a rear door D2 with a spoiler S2 mounted at the top of the door D2 at the rear end of the roof R2. The spoiler S2 has a brake light B2 at its center. The brake light B2 is originally attached to the spoiler S with a pair of bolts 154 rigidly mounted in the brake light that fit through a corresponding set of preexisting openings in the spoiler S2 (not shown) and thread into a corresponding set of nuts on the underside of the spoiler S2 (not shown), where each preexisting opening constitutes an attachment point or structure for the light assembly 100. Of course, in other vehicles, the brake light B2 may for example be alternatively attached to the spoiler S2 with bolts that fit through openings in the brake light and screw into threaded openings in the spoiler.

The spoiler S2 is originally attached to the rear door D2 with a series of bolts 160 rigidly mounted in the spoiler S2 that fit through a corresponding set of preexisting openings 152 in the door D2 and thread into a corresponding set of nuts on the inside of the door D2 (not shown), where each preexisting opening 152 constitutes an attachment point or structure for the light assembly 100. By way of example, a pair of matching light bar assemblies 100 are shown to be mounted to the vehicle V2 where there are no preexisting lights on the vehicle V2, between the spoiler S2 and the rear door D2, at attachment point or structures 154.

The light bar 100 is configured to conform to the contours of the vehicle V2 such that at least some of the slots 140, 144 and 150 in the support 112 are shaped, sized and located to mate with a corresponding set of preexisting openings in the vehicle V2 at the attachment points or structures 154, which may include openings in the spoiler S2 or the spoiler brake light B2, to thereby enable the securing of the support 112 to the vehicle V2 without modification to the vehicle V2 of the support 112. For the embodiment shown in FIGS. 7 and 8, the supports 112 for the light bar assemblies 100 mirror each other in shape with the wiring W2 for each assembly extending towards each other from the inner ends of the channels formed in the respective assemblies 100.

In this regard, the slots 140 in the support 112 are shaped, sized and located to mate with four of the corresponding set of preexisting openings 152 in rear door D2 and the four preexisting threaded bolts 160 mounted in and extending from the underside of the spoiler S2 that correspond to the four preexisting openings 152 to which the slots 140 mate. In addition, the slots 144 in the support 112 are shaped, sized and located to mate with and slidingly receive the corresponding set of preexisting bolts 154 extending from the underside of the brake light B2 and the corresponding set of preexisting openings in the spoiler S2 (not shown), and to mate with and slidingly receive the brake light bolts 154 there through. For safety, a plastic or rubber protective U-shaped strip 147 is snugly secured along the edge of the upper portion 116 of the support 112.

As can be seen in FIGS. 7 and 8, the light bar 100 is configured to conform to the contours of the vehicle V2 to which it will be mounted. However, not all of the slots 140, 144, 150 and 152 are necessarily utilized to attach the assemblies 100 to every model vehicle V2 to which the assembly 100 can be attached. Rather, only certain of the slots 140, 144, 150 and 152, which correspond to the preexisting openings 154 of the particular vehicle model V2 are used. Of course, for other vehicles V2, differing slots 140, 144, 150 and 152, which correspond to the preexisting openings 154 of the other vehicle model V2, will be used to attach the assembly to the vehicle V2. Here, for example, for the particular vehicle depicted as V2 in FIGS. 7 and 8, the support 112 does not require use of any of the slots 152 to secure the assembly 100 to the vehicle V2, while in other models of the vehicle V2, one or more of the slots 152 will be utilized to secure the assembly 100 to the vehicle V2.

To mount the assemblies 100 of the embodiment shown in FIGS. 4 and 7-8 to a vehicle V2, the spoiler S2 is first removed from the rear door D2 of the vehicle V2 by removing the nuts from spoiler mount bolts that protrude from the underside of the spoiler S and extend through the door D2. Next, the brake light B2 is removed from the spoiler S2 by removing the nuts from brake light mount bolts 154 that protrude from the underside of the brake light B2 and extend through the spoiler S2. Then, the outer leg 146 of one of the two supports 112 is positioned between the brake light B2 and the spoiler S2 such that the slot 144 aligns with and slides onto one of the two the brake light bolts 154. The second of the two supports 112 is likewise positioned on the other brake light bolt 154. The brake light B2 is then mounted to the spoiler S2 by tightening the nuts (not shown) to each of the bolts 154 under the spoiler S2 with the brackets 146 secured there between. Next, the slot 140 of one of the two supports 112 slides onto one of the two the spoiler mount bolts 160. The second of the two supports 112 slides on the other spoiler mount bolt 160. As can be appreciated, this positions the lower portions 138 of each of the supports 112 against the underside of the spoiler S2. After the assemblies 100 are in place and the appropriate electrical connections are made, the spoiler S2, with the supports 112, is reattached to the door D2 by sliding the spoiler mount bolts 160 through the corresponding openings 152 in the door D2 and tightening the nuts (not shown) to each of the bolts 152 on the inside of the vehicle V2 with the lower portions 138 of each of the supports 112 secured there between. The completed mount is shown in FIG. 8.

While we have described in the detailed description two configurations that may be encompassed within the disclosed embodiments of this invention, numerous other alternative configurations, that would now be apparent to one of ordinary skill in the art, may be designed and constructed within the bounds of our invention as set forth in the claims.

For example, the wiring W for the lights 14 can be threaded through one or more openings in the support 12, such as for example the slots 40 and 44, that correspond to one or more preexisting openings in the vehicle V, such as for example the preexisting openings 52. Similarly, the light bar assembly 10 could be configured to house batteries to power the lights 14. The assembly 10, 100 can be configured to attach to the vehicle V, V2 at a location other than between the spoiler S, S2 and the door D, D2, such as for example on the door D, D2 of a vehicle V, V2 having no spoiler S, S2; below the window of the rear door D, D2; or on top of the roof R, R2.

In other variations, the attachment points or structures can comprise a wide variety of known configurations and devices, such as for example, lugs; slots; openings; threaded openings; imbedded bolts or screws; hooks; or clips. Likewise, the fasteners can comprise a wide variety of devices, such as for example, screws, bolts, hooks, nuts, clips, etc. In addition, while the embodiments shown in the drawings each require more than one assembly to span the rear door R, R2, the assembly 10, 100 can alternatively be configured to span the entire rear door R, R2 as a single unit. Further, the assembly 10, 100 can alternatively be constructed from materials other than sheet metal, including for example, formed plastic or machined metals.

What is claimed is:

1. In combination with a vehicle comprising a body with a spoiler mount surface and a spoiler removably attached to the spoiler mount surface, the spoiler mount surface having a plurality of vehicle mount points that form a first mount pattern on the spoiler mount surface, the spoiler having a lower surface that engages the spoiler mount surface at the plurality of vehicle mount points in the first mount pattern when the spoiler is mounted to the vehicle, a light bar assembly comprising:
   a. an elongate support having a plate with plurality of mount openings through the plate, a first portion of said mount openings having the same pattern as the first mount pattern;
   b. a light attached to the support, the light providing selective illumination as desired by an operator of the vehicle; and
   c. a plurality of fasteners sized and shaped to fit through the plurality of mount openings and releasably engage the spoiler lower surface above the support and simultaneously engage the plurality of vehicle mount points on the spoiler mount surface below the support when the support is positioned on the spoiler mount surface and engages the lower surface of the spoiler with the mount openings aligned to the vehicle mount points to thereby secure the support to the vehicle between the spoiler and the vehicle body.

2. The combination of claim 1, wherein the support removably attaches to the vehicle.

3. The combination of claim 1, wherein the plurality of vehicle mount points comprise a plurality of preexisting openings formed in the body of the vehicle.

4. The combination of claim 3, wherein the plurality of vehicle mount points consist of a plurality of preexisting openings formed in the body of the vehicle.

5. The combination of claim 3, wherein at least one of the plurality of mount openings is elongated.

6. The combination of claim 5, wherein at least one of the plurality of mount openings is elongated in a generally longitudinal direction relative to the length of the support, and at least one other of the plurality of mount openings is elongated in a generally transverse direction relative to the length of the support.

7. The combination of claim 1, further comprising a second vehicle comprising a second body with a second spoiler mount surface and a second spoiler removably attached to the second spoiler mount surface, the second spoiler mount surface having a second plurality of vehicle mount points that form a second mount pattern on the second spoiler mount surface, the second mount pattern being different than the first mount pattern, the second spoiler having a lower surface that engages the second spoiler mount surface at the second plurality of vehicle mount points in the second mount pattern when the second spoiler is mounted to the second vehicle, wherein a second set of said plurality of mount openings has the same pattern as the second mount pattern.

8. The combination of claim 7, wherein the second plurality of vehicle mount points comprise a plurality of preexisting openings formed in the second body of the second vehicle.

9. The combination of claim 8, wherein the second plurality of vehicle mount points consist of a second plurality of preexisting openings formed in the second body of the second vehicle.

10. The combination of claim 1, further comprising a plurality of lights attached to the support.

11. The combination of claim 1, wherein the vehicle body comprises a roof and the support mounts to the roof of the vehicle.

12. The combination of claim 1, wherein the vehicle body comprises a door and the support mounts to the door of the vehicle.

13. The combination of claim 1, wherein at least one of said plurality of mount openings provides for routing of electrical wiring between the vehicle and the light when the support is mounted to the vehicle and the light is mounted to the support.

14. The combination of claim 1, wherein at least one of said plurality of fasteners is mounted in the spoiler.

15. The combination of claim 1, wherein at least one of said plurality of fasteners comprises a bolt.

16. The combination of claim 1, wherein the spoiler mount surface further comprises a second plurality of vehicle mount points that form a second mount pattern on the spoiler mount surface, the assembly further comprising an elongate second support having a second plate with second plurality of mount openings through the second plate, a first portion of said second mount openings having the same pattern as the second mount pattern, the assembly further comprising a second plurality of fasteners sized and shaped to fit through the second plurality of mount openings and releasably engage the spoiler lower surface above the second support and simultaneously engage the second plurality of vehicle mount points on the spoiler mount surface below the second support when the second support is positioned on the spoiler mount surface and engages the lower surface of the spoiler when the second mount openings are aligned with the second vehicle mount points to thereby secure the second support to the vehicle between the spoiler and the vehicle body.

17. A light bar assembly for mounting to a vehicle having a body and a spoiler removably mounted to the body, the assembly comprising:
  a. an elongate light bar support comprising a generally flat elongate spine, a light mount bracket extending along the length of the spine, the light mount bracket having a plurality of wiring openings there through, each of said plurality of wiring openings configured to receive the wiring of a light mounted to the bracket, the support further comprising a first tab extending outward in a first direction from the spine and having a first opening formed therein and a second tab extending outward from the spine in a second direction and having a second opening formed therein, the tabs shaped, sized and positioned on the spine to mount to the vehicle body under the spoiler;
  b. a plurality of fasteners, each fastener configured to operatively engage one of said tab openings to attach the support to the vehicle body; and
  c. at least one light attached to the support light mount bracket in proximity to one of said plurality of wiring openings, the light having electrical wiring, the electrical wiring being routed through said one of the plurality of wiring openings, the light providing selective illumination as desired by the operator of the vehicle.

18. A light bar assembly of claim 17, wherein the first tab extends from a first edge of the spine and the second tab extends from a second edge of the spine.

19. The light bar assembly of claim 17, wherein the first opening is slotted in a first slot direction.

20. The light bar assembly of claim 19, wherein the second opening is slotted in second slot direction generally perpendicular to the first slot direction.

* * * * *